2,770,654

CATALYTIC REGENERATION OF PHENYL-ACETALDEHYDE FROM ITS TRIMER

Walter B. Trapp, Midland, Mich., assignor to The Dow Chemical Company, Midland, Mich., a corporation of Delaware No Drawing. Application November 19, 1953, Serial No. 393,248

4 Claims. (Cl. 260—599)

This invention relates to an improved method for the regeneration of phenylacetaldehyde from its trimer, 2,4,6-tribenzyl-s-trioxane.

It is known that phenylacetaldehyde tends to polymerize on standing. It is also known that phenylacetaldehyde may be converted to a stable, crystalline trimer, 2,4,6-tribenzyl-s-trioxane, and that this trimer is a practical form in which to store phenylacetaldehyde for long periods of time. Finally, it is known that the said trimer yields phenylacetaldehyde when pyrolysed at temperatures from about 200° to 250° C. Unfortunately, such pyrolysis is accompanied by side reactions which include irreversible polymerizations and tar formation. In consequence of these side reactions, the yield of the regenerated acetaldehyde is low and, because the trimer is carried over with the aldehyde in operations near the pyrolysis temperature, the regenerated phenylacetaldehyde contains some of the trimer and is of poor quality.

Strongly acidic catalysts have been tried, since these are effective agents in the regeneration of other aldehydes from their trimers, but such common agents as zinc chloride, polystyrene sulfonic acid, and the strongly acidic acid-treated earths, produce tars which lower the yields of the aldehyde.

It is an object of the invention to provide an improved method for the regeneration of phenylacetaldehyde from its trimer, in which the aldehyde is recovered in high yields and with a product purity above 95 percent.

The foregoing and related objects are attained, according to the present invention, by heating the crystalline 2,4,6-tribenzyl-s-trioxane to a temperature in the range from 90° to 160° C. and in contact with (preferably from 0.5 to 10 percent of its initial weight of) an earth which has an "acidity factor" (defined below) in the range from —10 to 100, while maintaining thereon an absolute pressure of not to exceed 15 millimeters of mercury.

The acidity factor of the catalyst is defined as the number of milligrams of potassium hydroxide required to neutralize one gram of the catalyst. A negative "acidity" factor is the number of milligrams of alkalinity in a gram of the catalyst, calculated as though that alkalinity were due to potassium hydroxide. While the satisfactory range of acidity factor values is from —10 to 100, the best results are obtained with catalysts whose acidity factor is from 0 to 20. Catalytic activity declines rapidly as the acidity factor falls below —10, and tar formation increases rapidly as the acidity factor exceeds 100.

Several types of earths and clays have been found to be satisfactory for use in the present process. These include fuller's earth, Florida earth, Japanese acid earth, bentonite, and several chemically treated earths such as those known by the trade mark names of "Neutrol-E," "Activite" No. 459, "Florex" XXF, and "Magnesol," all of which are obtainable with acidity factors in the useful range.

Temperatures below 160° C. are necessary, in order to avoid excessive tar formation or contamination of the product, or both. For the regeneration to be practically effective, the phenylacetaldehyde must be removed from the regeneration chamber, as formed. To avoid degradation of the aldehyde, and contamination with either the trioxane compound or the amorphous high polymer formed at pyrolytic temperatures, the aldehyde must be distilled, as formed, at a temperature below the auto-polymerization temperature and below the pyrolysis temperature. To these ends, pressures of 15 millimeters, or lower, are maintained on the system during the regeneration and recovery of the phenylacetaldehyde. Operations at pressures as high as 20 millimeters have proven unsatisfactory. Under the preferred conditions, the pot temperature and the escaping vapor temperature are from 50 to 150 degrees lower than in the prior and unsatisfactory pyrolytic process. Thus, uncatalyzed pyrolysis occurs at 205° to 250° C.; polymerization to amorphous high polymers occurs in the same range; and phenylacetaldehyde boils at 195° C. at atmospheric pressure, and at 80° C. at 10 millimeters pressure.

The following example illustrates the practice of the invention:

A charge of 240 grams of 2,4,6-tribenzyl-s-trioxane crystals and 2.4 grams of fuller's earth (acidity factor 1.5) was heated in a flask fitted with a fractionating column. The pressure in the flask was adjusted to 10 millimeters, and the temperature in the flask ranged from 90° C. when regeneration started, to 160° C. when the reaction was complete, while the temperature at the top of the column was about 80° C. throughout the reaction which was run at such a rate that the trimer was decomposed in the course of 5 hours. There was obtained a 90 percent yield (216 grams) of phenylacetaldehyde of at least 96 percent purity. The purity of the aldehyde recovered in the early stages of the process was about 99 percent.

The same temperature and pressure conditions were used in a run in which the trimer was introduced in small lots into the heated vessel and mixed with the fuller's earth, and the aldehyde was recovered continuously. Under these conditions, the product was obtained in the same yield and purity, but at a much higher rate, as only 2.5 hours were required to regenerate the aldehyde from 240 grams of trimer.

Numerous runs were made under a variety of conditions, at various pressures and both with and without catalyst, to observe the effects of these conditions on the yield and purity of the regenerated aldehyde.

Typical results appear in the following table.

Table 1

| Grade of Trimer | Catalyst | Pressure | Phenylacetaldehyde obtained | | |
|---|---|---|---|---|---|
| | | | Yield, Percent | Purity, Percent | Nature of Impurity |
| Technical (M. P. 152°–156° C.) | None | 1 atm | 45.6 | 75–80 | Water. |
| Recrystallized (M. P. 155°–157° C.) | do | 1 atm | 56.5 | 90–95 | Do. |
| Technical | do | 10 mm | 60 | 79 | Trimer. |
| Recrystallized | do | 10 mm | 80 | 93 | Do. |
| Do | 1% fuller's earth | 10 mm | ¹85 | 96–100 | |
| Technical | 2% fuller's earth | 1 atm | 32.8 | 60 | Water. |
| Do | 1% fuller's earth | 10 mm | 88–90 | 96–100 | |

¹ NOTE.—This run not pushed to completion.

It is noted that the catalytic method of this invention gives higher yields and better quality of the aldehyde, starting with a technical grade of trimer, than does the uncatalyzed pyrolytic method starting with recrystallized trimer.

The phenylacetaldehyde recovered by the present method is somewhat more stable than that obtained by the uncatalyzed pyrolysis of 2,4,6-tribenzyl-s-trioxane. This was shown by a series of tests in which samples of the aldehyde were stored for periods up to 16 weeks both in sealed and in periodically opened vessels, and both at 0° C. and at 25° C. At the end of the test periods the samples were analyzed by a method (reaction with hydroxylamine hydrochloride) known to be accurate within 1 per cent. Typical results are shown in Table II.

Table II

| Age of sample (weeks) | Storage Temperature, °C. | Air Exposure | Purity of Aldehyde | |
|---|---|---|---|---|
| | | | Catalyzed | Uncatalyzed |
| 6 | 25 | Periodically opened | 91.5 | 86.3 |
| 12 | 25 | do | 76.0 | 75.3 |
| 16 | 25 | sealed | 81.4 | 72.5 |
| 16 | 0 | do | 94.9 | 88.7 |

It is noted that, while low temperature storage out of access to air is more favorable to the aldehyde than room temperature storage, the aldehyde made by the present catalytic method retains a higher aldehyde activity than does the product of uncatalyzed pyrolysis. No polymerization inhibitor was added to any of the reported samples.

I claim:

1. The method which comprises heating 2,4,6-tribenzyl-s-trioxane to a temperature in the range from 90° to 160° C. at an absolute pressure of not to exceed 15 millimeters of mercury, in contact with a catalyst which is an earth having an acidity factor in the range from −10 to 100, and withdrawing the so-regenerated phenylacetaldehyde from the heated zone as formed.

2. The method claimed in claim 1, wherein the catalyst has an acidity factor from 0 to 20.

3. The method claimed in claim 2, wherein the catalyst is fuller's earth.

4. The method claimed in claim 1, wherein the amount of catalyst present is from 0.5 to 10 percent of the weight of the 2,4,6-tribenzyl-s-trioxane in the heated zone.

References Cited in the file of this patent

UNITED STATES PATENTS

| 2,628,983 | Aller et al. | Feb. 17, 1953 |
| 2,649,462 | Young | Aug. 18, 1953 |

FOREIGN PATENTS

| 676,770 | Great Britain | Aug. 6, 1952 |